United States Patent [19]

Mucheyer et al.

[11] Patent Number: 4,524,945
[45] Date of Patent: Jun. 25, 1985

[54] PRESSURE-FLUID OPERATED LIMIT SWITCH

[75] Inventors: Norbert Mucheyer, Rechtenbach; Heinz Schulte, Marktheidenfeld, both of Fed. Rep. of Germany

[73] Assignee: Mannesmann Rexroth GmbH, Lohr, Fed. Rep. of Germany

[21] Appl. No.: 447,627

[22] Filed: Dec. 6, 1982

[30] Foreign Application Priority Data

Dec. 8, 1981 [DE] Fed. Rep. of Germany ....... 3148500

[51] Int. Cl.³ ............................................. F16K 31/52
[52] U.S. Cl. ...................................... 251/75; 251/239; 251/241; 251/339
[58] Field of Search .............. 251/339, 231, 239, 241, 251/75, 77

[56] References Cited

U.S. PATENT DOCUMENTS

| | | | |
|---|---|---|---|
| 616,197 | 12/1898 | Moller | 251/241 X |
| 1,173,672 | 2/1916 | Macloskie | 251/239 X |
| 2,482,223 | 9/1949 | Strid et al. | 251/241 |

FOREIGN PATENT DOCUMENTS

| | | | |
|---|---|---|---|
| 581659 | 7/1933 | Fed. Rep. of Germany | 251/241 |
| 607188 | 8/1960 | Italy | 251/231 |

*Primary Examiner*—Arnold Rosenthal
*Attorney, Agent, or Firm*—Michael J. Striker

[57] ABSTRACT

A pressure fluid operated limit switch, particularly for a device for controlling an adjusting element in dependence upon a control value and a reference value. The limit switch includes a housing formed with a recess in which a spring-biased valve member is positioned. The valve member normally abuts against a valve seat formed by a shoulder in the switch housing is at times moved away from that seat against the force of the spring in response to a condition of the adjusting element with which the limit switch is mechanically connected. In order to ensure rapid movement of the valve member away from its seat and thus preventing throttling of the pressure fluid when the switch is in its open position the valve member is provided with the actuating element rigidly connected thereto and carrying at its free end an axially slidable sleeve biased by a spring which is clamped between that sleeve and the valve member.

7 Claims, 2 Drawing Figures

PRESSURE-FLUID OPERATED LIMIT SWITCH

BACKGROUND OF THE INVENTION

The present invention relates to devices for controlling pressure-fluid operated adjusting elements in dependence upon a control value and a reference value in hydraulic or pneumatic control circuits. More particularly, this invention relates to a hydraulic or pneumatic limit switch installed in the control circuit of the adjusting element.

In known hydraulically controlled check valves an actuating member is formed as a piston which is constantly under control pressure, which piston has a valve element adapted to move away from its valve seat in dependence upon the pressure acting on the piston so that pressure medium flowing through the check valve is more or less sufficiently throttled. Such a check valve is disclosed for example in the article "Oil-Hydraulics" by Dr. Heinz Zoebl, published in "Springer-Verlag", Vienna, 1963, page 162.

Another structure of the check valve (described in Dieter "Oil-Hydraulics" book "Krausskopf-Verlag", Wiesbaden, 1960, page 170) includes an actuating member which is moved from its seat so far away by a hand lever in order to be displaced to its end positions that any throttle action for pressure medium flowing through the check valve can be hardly exercised.

SUMMARY OF THE INVENTION

It is an object of the invention to provide a limit switch for an adjusting element which would avoid the disadvantages of the check valves of known constructions.

It is another object of the invention to provide a limit switch operated such that its valve member, when the valve is opened, will be rapidly and sufficiently far away moved from its seat such that in the open position of the valve a throttling action on the pressure medium flowing therethrough would be avoided.

These and other objects of the invention are attained by a limit switch for a pressure fluid operated device for controlling an adjusting element depending on a control value and reference value, comprising a valve housing provided with a recess and formed with a valve seat; a valve member located in said recess and abutting said valve seat when the switch is in its closed position; a valve spring biasing said valve member, said valve member being adapted at times to move away from said valve seat against the action of said valve spring; an actuating member rigidly connected to said valve member and having a portion extended outwardly therefrom beyond said valve seat in said housing; a sleeve mounted on said portion and adapted to axially slide thereon; and a prestressed spring clamped between said sleeve and said valve member.

In accordance with a further feature of the invention the portion of the actuating member may have a free end formed with a stop collar, the sleeve being provided with a stop flange projecting inwardly to said portion and cooperating with the stop collar.

According to a still further modification of the invention the valve member may be formed with a collar in the region of the prestressed spring to hold the actuating member in the valve member and in the region of the valve spring the valve member may be connected to the actuating member by means of a rivet.

The limit valve switch may further include a rotatable control shaft located in said housing and cooperating with said actuating member.

The switch housing may be formed with a chamber surrounding the valve spring and with a chamber surrounding the prestressed spring mounted on the actuating member.

The switch housing may be further formed with a connection bore communicating the chamber surrounding said valve spring with the pressure fluid-operated device and with a channel communicating the chamber surrounding said prestressed spring with the pressure fluid-operated device.

The limit switch may further include means for mechanically connecting the control shaft with the adjusting element of the pressure fluid-operated device, the connecting means being operative to rotate said control shaft and thus actuate said valve member to move the latter away from said valve seat in response to a position of the adjusting element After the valve member is moved away from its seat pressure of the pressure fluid acting on the valve member in a closing direction will be reduced and the valve member will be further moved or lifted away from its seat by means of said prestressed spring. The valve member in the limit switch has therefore only two operation positions, namely the closed position and the opened position in which the valve member is displaced far away from its closed position. The limit switch thus operates as a bistable switch in which intermediate positions of the valve member, in which pressure medium flowing through the switch is strongly throttled that leads to a strong heat development in the pressure medium, are avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The word "control value" has the meaning of "control signal" and "actual value" respectively. And the word "reference value" has the meaning of "input signal" and "nominal value" respectively.

DETAILED DESCRIPTION OF THE PREFERRED EMBODIMENTS

Figure 1:
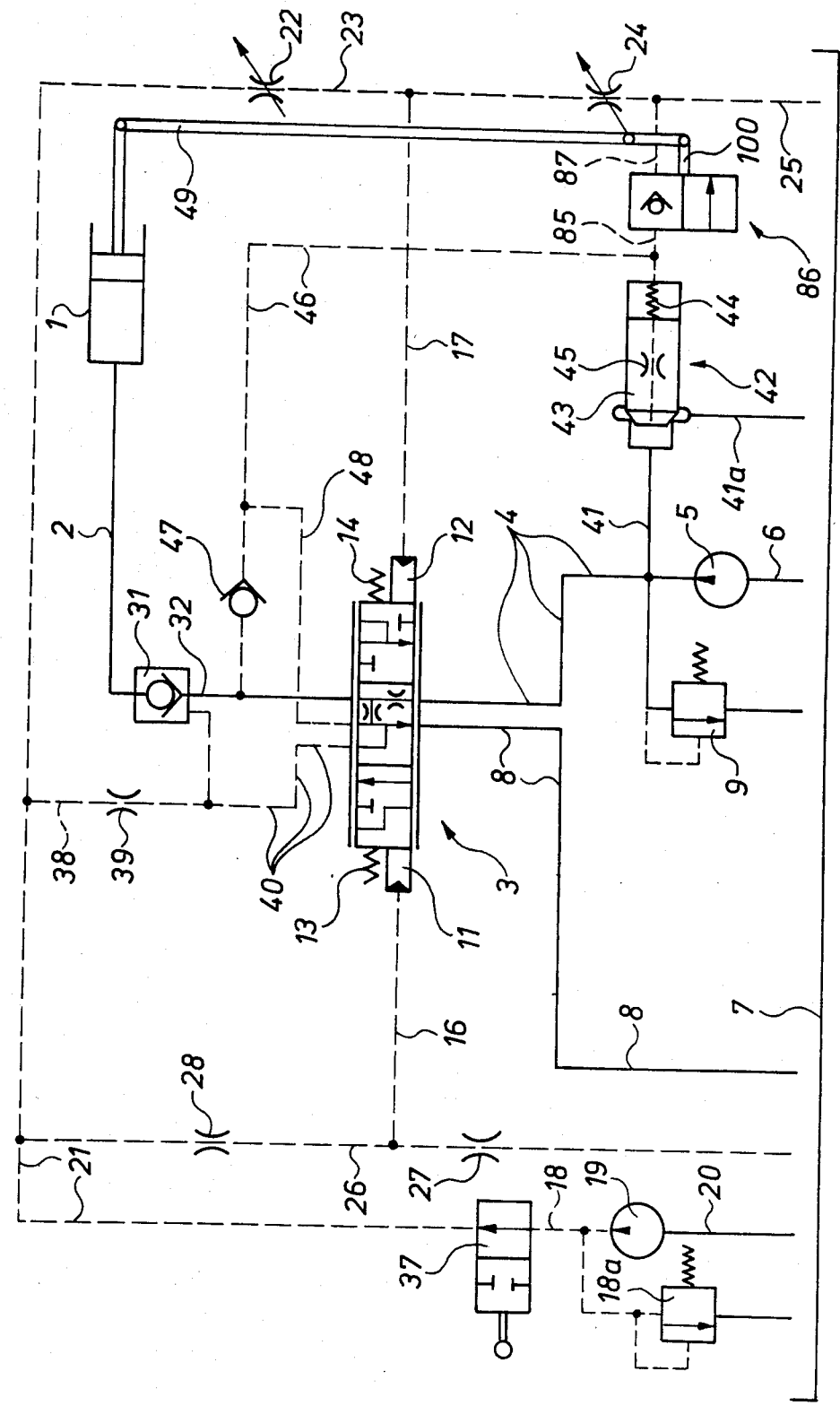
FIG. 1 is a schematic view of a pressure fluid-operated control circuit in which a limit switch according to the invention is inserted.

Referring to the drawings, and first to FIG. 1, an adjusting element 1, for example, of a piston-cylinder structure is connected to a pilot controlled check valve 31 openable in the direction of adjusting element 1 via a conduit 2. The closing of the pilot controlled check valve 31 can be prevented. Pilot controlled check valve 31 is in turn connected via conduit 32 with a three position-five way valve 3 operated by a pressure of pressure medium, e.g. liquid or gas, in two opposite directions. Valve 3 is formed as a proportional valve.

A pump 5 having a suction line 6 extended into a pressure fluid supply container 7 is connected to valve 3 through a conduit 4. Another conduit 8 connects valve 3 immediately to the pressure fluid supply container 7. A pressure-limiting valve 9 whose discharge is connected to the fluid supply container 7 is at its input side connected to conduit 4.

Three position-five way valve 3 includes a slide 5 which is reciprocated between two control chambers 11 and 12 when pressure medium is admitted into the valve such that the slide is displaced against the action of respective control springs 13, 14. Both control springs 13, 14 maintain the slide of valve 3 in its central position when equal pressures exert in both control chambers 11, 12. Control chamber 11 is in communication with a conduit line 16 whereas control chamber 12 is in communication with a conduit line 17.

A further conduit 18 is provided in the hydraulic or pneumatic circuit of FIG. 1, which conduit is connected to the pressure side of a control pump 19 which in turn is connected to a suction conduit 20 extended into the fluid supply container 7. A pressure-limiting valve 18a of a known construction is provided in the circuit, which valve is in communication with the conduit 18; the latter is connected through a hand-operated two position-two way valve 37 to a control conduit line 21 which leads to an adjusting throttle 22. A further control conduit line 23 leads from the throttle 22 to another adjusting throttle 24, the latter being connected to fluid supply container 7 via a conduit 25.

The conduit line 23 is also connected to the conduit line 17 leading to the control chamber 12 of valve 3. Two additional throttles 27 and 28 are provided in the circuit, one of which is interconnected between conduit line 16 and control conduit line 21 through a conduit 26 and another is connected to conduit 26 and conduit line 16 at one side thereof and to the fluid supply container 7 at the opposite side thereof. Throttles 27 and 28 can be formed as adjusting throttles similarly to throttles 22 and 24.

A further conduit 38 which starts from control conduit line 21 has included therein a further throttle adjustment means 39 which at the side thereof facing away from conduit line 21 is connected to a conduit 40 leading to the valve 3 and to the control side of the pilot controlled check valve 31.

In a conduit 41 leading from the conduit 4 there is inserted a pressure compensator 42 which is connected to the fluid supply container 7 by means of a conduit 41a, piston manometer 42 being opened under pressure difference amounted to about 5 bar. The pressure compensator 42 also connected to pump 5 has a seat member 43 which is maintained in its closed position by means of a spring 44. It is to be understood that connection between conduits 41 and 41a does not take place when the seat member 43 is in its closed position. The seat member 43 is provided with a throttle adjustment means 45 and connected to a control conduit 46. The latter, through a check valve 47 openable toward conduit 32, is connected to the conduit 32.

A still further control conduit 48 branches off the conduit 46 and leads to the valve 3. The movable portion of the adjusting element 1, e.g. piston in the preferred embodiment, is mechanically connected by a mechanical connecting element 49 to an adjusting member of the adjusting throttle 24.

The limit switch according to the invention generally denoted at 86 is interconnected in the pressure fluid circuit between a conduit 85 leading to the conduit 46 and a conduit 87 connected to the conduit 25 extended into the fluid supply container 7. Connecting element 49 is mechanically connected to an operating lever 100 the function of which will be explained below.

Figure 2:
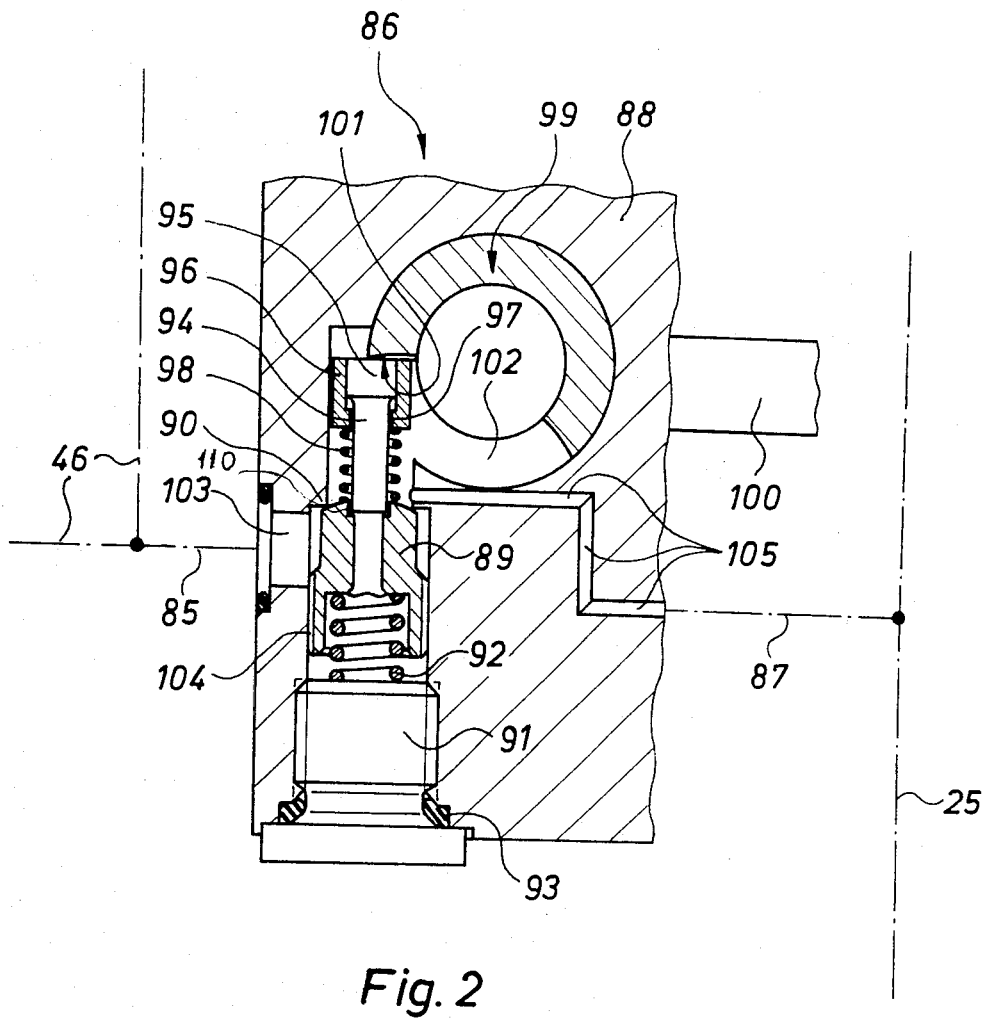
FIG. 2 is an axial sectional view through the limit switch according to the invention.

Referring now to FIG. 2 the limit switch 86 includes a housing 88 provided with a recess in which a valve member 89 is axially slidably positioned. Valve member 89 cooperates with a valve seat 90 formed by a shoulder in the housing 88. A supporting screw 91 is threaded into the housing 88 at the side of the recess opposite to the valve seat 90. A prestressed valve spring 92 is clamped between the end face of screw 91 and valve member 89. A recess formed in the housing 88 in the region of the flange of the supporting screw 91 is sealed by means of a sealing ring 93.

A rod-shaped actuating member 94 is inserted with its end portion into the valve member 89. The other portion of the actuating member 94 extends outwardly from the valve member 89 in the direction away from the spring 92. Actuating member 94 is provided at its free end with a stop flange 95. The limit switch 86 further includes a clamping sleeve 96 which is adapted to axially slide in the actuating member 94. This sleeve is formed with a stop flange or projection 97 extended inwardly of the sleeve 96, this projection forming with the stop flange 95 a stop for the sleeve 96. A prestressed spring 98 biasing the sleeve 96 is clamped between the sleeve 96 and the end surface of the valve member 89. The actuating member 94 is extended through the valve member 89 and in the region of valve spring 92 is connected to valve member 89, for example by riveting. In the region of spring 98 the actuating member 94 is provided with a collar 110 to rigidly hold the actuating member 94 in the valve member 89. Actuating member 94 with its stop flange 95 extends beyond the valve member 89 in the region of spring 98.

A control shaft 99 with an axis extended perpendicular to the axis of the valve member 89 is rotatably positioned in the housing 88. Namely, control shaft 99 is turned by means of the operating member 100 linked to the connecting member 49 joined as mentioned above to the movable piston of the adjusting element 1.

Shaft 99 is hollow and is formed with a radially extended control portion 101 which defines a recess 102 having a sector angle of about 130°.

The housing 88 of the limit switch is formed with a connection bore 103 communicated with the conduit 85 and with an angular channel 105 connected to the conduit 87 of the pressure fluid circuit. Connection bore 103 opens into a hollow chamber of housing 88 surrounding the valve member 89. The latter is formed with longitudinal grooves 104. Thus pressure medium entering connection bore 103 can flow into the hollow space surrounding valve spring 92. The end portion of angular channel 105 opens into another hollow space surrounding the spring 98.

The slide of valve 3 shown in FIG. 1 is illustrated in its central position whereby conduits 40 and 48 are connected to the fluid supply container 7 and pump 5 conveys pressure fluid through the pressure compensator 42 into the fluid supply container 7. The adjusting element 1 is maintained in its respective position by the closed pilot controlled check valve 31. The conduits 4 and 8 are connected to each other in accordance with the position of the slide in valve 3 in a more or less throttling manner.

If the position of the nominal value-transmitter 22 is changed then pressure of pressure medium in control conduit 16 and/or 17 will also change. If, for example the slide of valve 3 is now displaced to the right, in the plane of the drawing, the throttling, after the first predetermined path of the slide, between the conduit 4 and conduit 32 will be reduced and the piston manometer 42 will be switched under pressure. After a second predetermined displacement path of the slide of valve 3 pump 5 will be immediately connected to the conduit 32 so that the piston of the adjusting element 1 after respective throttling in valve 3 will extend relatively rapidly out of its cylinder. Due to the connection of the control conduit 46 with the conduit 32 the fluid pressure of pump 5 on the adjusting element 1 will be limited. As long as only a small pressure difference prevails between both control chambers 11 and 12 pressure medium will be transmitted to the adjusting element 1 in dependence upon a size of the throttle adjustment means 45 in the piston manometer 42. The piston manometer 42, throttle adjustment means 45, control check valve 47 and valve 3 act in the mode of 3-way flow governors.

If the slide of valve 3 is displaced to the left in the plane of the drawing then after a first predetermined travel path of the slide, control conduit 40 will be separated from the fluid supply container 7 and after a second predetermined travel path of the slide of valve 3 conduit 32 will be connected to the fluid supply container 7. Fluid pressure prevailing in the conduit 40 will open the pilot controlled check valve 31 and pressure fluid would flow from the adjusting element 1 to the fluid supply container 7 so that the piston of the adjusting element 1 will move into its cylinder.

As seen in FIG. 2, as soon as the piston of the adjusting element 1 moves out of the cylinder over a predetermined path the limit switch 86 will be actuated by rotation of control shaft 99 connected through lever 100 and connecting member 49 to that piston. It is understood that any conventional mechanism can be used between the lever 100 and control shaft 99 to provide for rotation of the latter. If control shaft 99 is initially rotated this shaft turns in the counter clockwise direction as in the position shown in FIG. 2, in which the control portion 101 of the shaft 99 lies against the end surface of the actuating member 94. If the control shaft is further rotated in the counterclockwise direction then the valve member 89 will move away from its seat 90 and pressure medium will flow from the conduit 85 into connection bore 103, the space surrounding the actuating member 94, angular channel 105 and then into conduits 87 and 25 and from there into the fluid supply container 7. Fluid pressure in the hollow space surrounding the valve spring 92 will suddenly drop and the valve member 89 will under the action of spring 98 further move away from its seat in a sudden-like manner. By loading the piston manometer 42 its seat member 43 will be moved away from its seat under pressure prevailing in conduit 41 and pressure fluid conveyed from pump 5 will flow into the fluid supply container 7 via the conduit 41a.

The valve member 89 will be closed by the force of the valve spring 92 when the control shaft 99 is turned through some angle back; the force of spring 98 will then urge the projection 7 of the sleeve 96 again into the position in which it lies against the stop flange 95 of the actuating member 94. The spring 98 will thus be tensioned and the valve member 89 under the force of the valve spring 92 will be brought back to abut against its seat 90. Pressure can again be built up in the connection bore 103 so that the valve member 89 will be rigidly held in its closed position.

Due to the regulating of the stroke of the adjusting element 1 when its piston moves in a predetermined manner it is avoided that pump 5 under pressure further transmits fluid into the system and that pressure medium not received in the system must be sprayed off through the pressure-limiting valve 9, which leads to an excessive heat development in the pressure medium, It is also prevented due to this invention that mechanical components usually utilized with the adjusting element and developing large forces are overloaded. The limit switch 86 is directly inserted in the control circuit whereby any selected mode of operation of the circuit is not disturbed. No functional difficulties occur when the slide of the valve 3 is clamped. The switching of the system off in a predetermined condition of the adjusting element 1 is ensured by the limit switch 86.

It will be understood that each of the elements described above, or two or more together, may also find a useful application in other types of limit switches differing from the types described above.

While the invention has been illustrated and described as embodied in a limit switch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A limit switch for a pressure fluid-operated device including a pressure fluid source, an adjusting element, and a pressure compensator, the limit switch comprising a valve housing provided with a recess and formed with a valve seat; a valve member located in said recess and abutting said valve seat when the switch is in its closed position, said valve member having one side facing toward said seat and another side facing away from said seat; a valve spring arrange at said another side and biasing said valve member toward said seat, said valve member being adapted at times to move away from said valve seat against the action of said valve spring; and actuating member having an axis and rigidly connected to said valve member, said actuating member having a portion extended outwardly therefrom beyond said valve seat in said housing; a sleeve mounted on said portion and adapted to axially slide thereon; and a prestressed spring arranged on said actuating member at a side thereof facing away from said valve spring, said prestressed spring being clamped between said sleeve and said valve member, said portion including a stop flange extended radially outwardly therefrom and being integral therewith, said sleeve being formed with a stop projection extending inwardly toward said portion and cooperating immediately with said stop flange, said sleeve projecting beyond said actuating member in the direction of said axis when the switch is in its closed position.

2. The switch as defined in claim 1, wherein said valve member is formed with a holding shoulder in the region of said prestressed spring to hold the actuating member in said valve member, said valve member being connected to said actuating member by means of a rivet in the region of said valve spring.

3. The switch as defined in claim 2, further including a rotatable control shaft located in said housing and cooperating with said actuating member.

4. The switch as defined in claim 3, wherein a chamber surrounding said valve spring is provided in said housing and a chamber surrounding said prestressed spring is formed in said housing.

5. The switch as defined in claim 4, further inclding a connection bore formed in said housing and communicating said chamber surrounding said valve spring with the pressure fluid-operated device.

6. The switch as defined in claim 5, further including a channel formed in said housing and communicating said chamber surrounding said prestressed spring with the pressure fluid-operated device.

7. The switch as defined in claim 6, the limit switch being connected to said pressure compensator at said connection bore.

* * * * *